(12) United States Patent
Scarcelli et al.

(10) Patent No.: US 11,143,555 B2
(45) Date of Patent: Oct. 12, 2021

(54) METHODS AND DEVICES FOR REDUCING SPECTRAL NOISE AND SPECTROMETRY SYSTEMS EMPLOYING SUCH DEVICES

(71) Applicant: UNIVERSITY OF MARYLAND, COLLEGE PARK, College Park, MD (US)

(72) Inventors: Giuliano Scarcelli, Washington, DC (US); Eitan Edrei, Silver Spring, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 24 days.

(21) Appl. No.: 16/480,786

(22) PCT Filed: Jan. 25, 2018

(86) PCT No.: PCT/US2018/015236
§ 371 (c)(1),
(2) Date: Jul. 25, 2019

(87) PCT Pub. No.: WO2018/140602
PCT Pub. Date: Aug. 2, 2018

(65) Prior Publication Data
US 2020/0278250 A1    Sep. 3, 2020

Related U.S. Application Data

(60) Provisional application No. 62/451,353, filed on Jan. 27, 2017.

(51) Int. Cl.
*G01J 3/28* (2006.01)
*G01J 3/02* (2006.01)
(Continued)

(52) U.S. Cl.
CPC ............ *G01J 3/2803* (2013.01); *G01J 3/0208* (2013.01); *G01J 3/0229* (2013.01); *G01J 3/0297* (2013.01);
(Continued)

(58) Field of Classification Search
CPC ........ G01J 3/28; G01J 3/02; G01J 3/10; G01J 3/18; G01J 3/44; G01J 3/26
See application file for complete search history.

(56) References Cited

U.S. PATENT DOCUMENTS 3,909,132 A    9/1975  Barrett
5,051,602 A    9/1991  Sting et al.
(Continued)

FOREIGN PATENT DOCUMENTS

WO    WO 2008/124446 A1    10/2008
WO    WO 2008/137637 A2    11/2008
(Continued)

OTHER PUBLICATIONS

International Search Report and Written Opinion, dated Apr. 19, 2018, in International Application No. PCT/US18/15236.
(Continued)

*Primary Examiner* — Abdullahi Nur
(74) *Attorney, Agent, or Firm* — RowanTree Law Group, PLLC; Frederick F. Rosenberger

(57) ABSTRACT

In a spectrometry setup where a first spectral component dominates a second spectral component having a different wavelength, diffraction of the first spectral component as it passes through the optical train of the spectrometer can produce spectral noise that obscures detection of the second spectral component. To reduce the spectral noise, the light from the spectrometer is subject to spatial filtering or interference such that effects of the first spectral component are removed, or at least reduced. The second spectral com-
(Continued)

ponent can then be more readily detected by a detector after the spatial filtering or interference. In embodiments, the spatial filtering or interference may be provided by a filtering module, which may be installed in existing spectrometry setups or form part of a unitary spectrometry system.

22 Claims, 8 Drawing Sheets

(51) Int. Cl.
*G01J 3/10* (2006.01)
*G01J 3/18* (2006.01)
*G01J 3/44* (2006.01)

(52) U.S. Cl.
CPC . *G01J 3/10* (2013.01); *G01J 3/18* (2013.01); *G01J 3/2823* (2013.01); *G01J 3/4406* (2013.01)

(56) References Cited

U.S. PATENT DOCUMENTS

| | | | |
|---|---|---|---|
| 5,784,158 | A | 7/1998 | Stanco et al. |
| 7,466,421 | B2 | 12/2008 | Weitzel |
| 7,898,656 | B2 | 3/2011 | Yun et al. |
| 8,115,919 | B2 | 2/2012 | Yun et al. |
| 8,867,033 | B2 | 10/2014 | Carron et al. |
| 9,574,992 | B1 | 2/2017 | Salcin et al. |
| 10,386,288 | B2 | 8/2019 | Scarcelli et al. |
| 2006/0274308 | A1* | 12/2006 | Brady .................. G01J 3/2803 356/326 |
| 2009/0273777 | A1 | 11/2009 | Yun et al. |
| 2009/0323056 | A1 | 12/2009 | Yun et al. |
| 2012/0302862 | A1 | 11/2012 | Yun et al. |
| 2016/0139390 | A1 | 5/2016 | Bukshtab et al. |
| 2016/0151202 | A1 | 6/2016 | Scarcelli et al. |
| 2017/0176318 | A1 | 6/2017 | Scarcelli et al. |
| 2018/0188173 | A1 | 7/2018 | Scarcelli et al. |
| 2018/0284010 | A1 | 10/2018 | Scarcelli et al. |
| 2020/0182694 | A1 | 6/2020 | Scarcelli et al. |
| 2020/0256726 | A1 | 8/2020 | Scarcelli et al. |
| 2020/0355554 | A1 | 11/2020 | Scarcelli et al. |

FOREIGN PATENT DOCUMENTS

| | | |
|---|---|---|
| WO | WO 2009/134719 A2 | 11/2009 |
| WO | WO 2012/149570 A1 | 11/2012 |
| WO | WO 2015/010119 A2 | 1/2015 |
| WO | WO 2017/040959 A1 | 3/2017 |
| WO | WO 2017/112896 A1 | 6/2017 |
| WO | WO 2017/139747 A1 | 8/2017 |
| WO | WO 2019/089531 A1 | 5/2019 |

OTHER PUBLICATIONS

Lyot, M., "A study of the solar corona and prominences without eclipses," *Monthly Notices of the Royal Astronomical Society*, 1939, 99: pp. 580-94. (22 pages).
Scarcelli et al., "Cross-axis cascading of spectral dispersion," *Optics Letters*, 2008, 33: pp. 2979-2981. (3 pages).
Scarcelli et al., "Noncontact three-dimensional mapping of intracellular hydromechanical properties by Brillouin microscopy," *Nature Methods*, 2015, 12(12): pp. 1132-1136. (5 pages).
Soummer et al., "Achromatic dual-zone phase mask stellar coronagraph," *Astronomy & Astrophysics*, 2003, 403: pp. 369-381. (13 pages).
Antonacci et al., "Elastic suppression in Brillouin imaging by destructive interference," *Applied Physics Letters*, 2015, 107: 061102 (4 pages).
Edrei et al., "Integration of spectral coronagraphy within VIPA-based spectrometers for high extinction Brillouin imaging," *Optics Express*, Mar. 2017, 25(6): pp. 6895-6903.
Extended European Search Report, dated Nov. 11, 2020, in European Patent Application No. 18744502.8 (10 pages).
Scarcelli et al., "Multistage VIPA etalons for high-extinction parallel Brillouin spectroscopy," *Optics Express*, May 2011, 19(11): pp. 10913-10922.

* cited by examiner

METHODS AND DEVICES FOR REDUCING SPECTRAL NOISE AND SPECTROMETRY SYSTEMS EMPLOYING SUCH DEVICES

CROSS-REFERENCE TO RELATED APPLICATIONS

The present application claims the benefit of U.S. Provisional Application No. 62/451,353, filed Jan. 27, 2017, which is hereby incorporated by reference herein in its entirety.

STATEMENT REGARDING FEDERALLY SPONSORED RESEARCH

This invention was made with government support under R33CA204582A awarded by the National Institutes of Health (NIH). The government has certain rights in the invention.

FIELD

The present disclosure relates generally to spectrometry systems, and more particularly, to reducing spectral noise in spectrometry systems.

BACKGROUND

Optical spectrometers, whether etalon-based or grating-based, may be limited in their ability to distinguish between different spectral components by crosstalk between the different spectral components. High spectral extinction or spectral contrast can help minimize crosstalk, thereby allowing the detection of small spectral components close to larger spectral components without artifacts.

Existing methods to improve spectral contrast rely on preventing undesirable photons from being recorded or correcting for any recorded spectral noise in a post-process manner. But such methods may be insufficient to remove spectral noise in certain contexts, such as when spectral signatures are detected in epi-detection configuration, where the interrogating light to the sample and the detected light from the sample are directed through the same objective lens. In such configurations, the spectrometer may experience intense back reflection of the non-shifted interrogating light.

Moreover, existing spectroscopic methods generally do not consider or attempt to eliminate a fundamental noise component—the spectral noise due to the diffraction of light propagating through optical components of the optical train of the spectrometer. Optical components, such as imaging lenses, slits or any other aperture of a finite size can produce diffraction fringes, which in some cases may be significant compared to the signal of interest.

Embodiments of the disclosed subject matter may address one or more of the above-noted problems and disadvantages, among other things.

SUMMARY

Embodiments of the disclosed subject matter can improve the detection of very low intensity signals in spectrometers by eliminating (or at least reducing an intensity of) spectral noise due to diffraction and/or undesirable spectral components (e.g., interrogating light that has been reflected into the spectrometer). A filtering module can be added to existing spectrometry setups, or integrated into the design of a new spectrometry system, and can remove the undesirable spectral components and/or associated diffraction effects before they are detected by the detector.

For example, the filtering module can rely on spatial filtering between an output of the spectrometer and an input of the detector to remove (or at least reduce the intensity of) the spectral noise due to diffraction, while optical components inserted into the optical train of the spectrometer remove (or at least reduce the intensity of) undesirable spectral components (e.g., the interrogating light) propagating along the optical train of the spectrometer. In certain configurations, the optical components can be inserted into the optical train of the spectrometer without the filtering module to remove (or at least reduce the intensity of) the undesirable spectral components.

Alternatively or additionally, the filtering module can induce destructive interference between the spectrometer output, modulated by one or more optical components inserted into the optical train of the spectrometer, and the interrogating light as modulated by a phase/amplitude modulator, in order to remove (or at least reduce the intensity of) the spectral noise due to diffraction and/or the undesirable spectral components.

In one or more embodiments, a method includes reducing spectral noise caused by a first spectral component propagating through an optical train of a spectrometer by spatial filtering or interference between an output plane of the spectrometer and a detector. The method can also include detecting, at the detector, a second spectral component that has passed through the optical train of the spectrometer. The second spectral component can have a wavelength different from that of the first spectral component.

In one or more embodiments, a system includes a spectrometer, a detector, and a filtering module. The spectrometer can have an optical train. The filtering module can be constructed to produce spatial filtering or interference of light so as to reduce spectral noise caused by light propagating through the optical train of the spectrometer prior to being detected by the detector.

In one or more embodiments, a kit for modification of an existing spectrometry setup can include a filtering module constructed to produce spatial filtering or interference of light so as to reduce spectral noise caused by light propagating through an optical train of the spectrometer prior to being detected by the detector. A system can include a spectrometer and the kit for modification.

In one or more embodiments, a method can include separating first and second spectral components, received from a sample, using a spectrometer. The method can further include reducing an intensity of the first spectral component or noise induced by the first spectral component, and detecting at a detector the second spectral component.

Objects and advantages of embodiments of the disclosed subject matter will become apparent from the following description when considered in conjunction with the accompanying drawings.

BRIEF DESCRIPTION OF DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. For example, in some figures, the propagation of light has not been shown or has been illustrated using block arrows rather than employing ray diagrams. Throughout the figures, like reference numerals denote like elements.

DETAILED DESCRIPTION

In embodiments, the deleterious effects of a relatively higher intensity first spectral component in a spectrometry setup are mitigated in order to improve the detection of a relatively lower intensity second spectral component. In particular, embodiments of the disclosed subject matter can remove (or at least reduce an intensity of) the first spectral component and/or spectral noise due to diffraction of the first spectral component prior to detecting.

In every imaging system, including spectrometry systems, finite-sized optical elements generate diffraction patterns. In many scenarios, such diffraction noise is negligible due to its comparatively low intensity. Moreover, in some spectrometry setups where the interrogating light and emitted light are well separated, the diffraction noise can be avoided by placing a narrow-band filter (e.g., notch filter) to block the interrogating light. However, in other spectrometry setups, such as in Brillouin light scattering measurements, the frequency shift between the interrogating light and the emitted light is too small to allow use of conventional narrow-band filters. In such configurations, intense non-shifted interrogating light arising from elastic scattering or back-reflections can occur in the same plane and in close proximity to the low-intensity Brillouin signal of interest. As a result, confocal rejection or conventional spectral filtering may be unable to reject the interrogating light. The resulting spectral noise due to diffraction can have an intensity much greater than the emitted spectral component, thereby masking the spectral component from detection.

Figure 1:
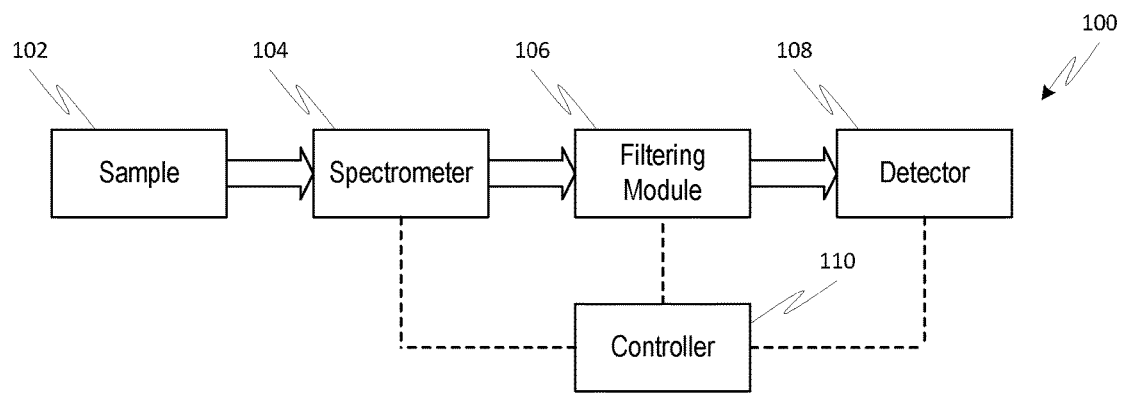
FIG. 1 is a simplified schematic diagram of a generalized spectrometry setup with reduced spectral noise, according to one or more embodiments of the disclosed subject matter.

FIG. 1 illustrates a setup 100 that can be used to remove the spectral noise due to a first spectral component (e.g., interrogating light) and/or associated diffraction effects to thereby enable detection of a second spectral component (e.g., emitted light). For example, a sample 102 can be illuminated with the interrogating light (e.g., light having a first wavelength from a laser source) and emitted light (e.g., scattered or fluorescent light having at least a second wavelength shifted or different from the first wavelength of the interrogating light) can be received by a spectrometer 104 for processing.

The spectrometer 104 can be any type of etalon-based or grating-based spectrometer, such as but not limited to, a Brillouin light scattering spectrometer, a Raman spectrometer, or a Rayleigh-wing scattering or fluorescence spectrometer. The second spectral component can thus be Brillouin scattered light, Raman or Rayleigh-wing scattered light or fluorescence light from the sample 102. Depending on the setup, a portion of the first spectral component (i.e., interrogating light) may also enter the spectrometer 104, for example, due to elastic scattering, back-reflections, or diffusion from a sample, and may otherwise obscure detection of the second spectral component by detector 108 (e.g., CCD camera).

A filtering module 106 can thus be provided to remove (or at least reduce) the deleterious effects of the first spectral component (e.g., interrogating light or any other undesirable spectral component) in order to allow detection of the second spectral component. The first spectral component can have a wavelength different from that of the second spectral component. In some embodiments, the first spectral component is relatively close in wavelength to the second spectral component. For example, the second spectral component can be shifted from the first spectral component on the order of 1-10 GHz (i.e., <0.02 nm, or even <0.001 nm, depending on the wavelength of the first spectral component). The first spectral component can also have an intensity larger than the second spectral component, for example, at least 10 times larger. In some embodiments, the first spectral component can be substantially more intense than the second spectral component, for example, at least $10^3$, $10^6$, or $10^9$ larger.

In some embodiments, at least a portion of the filtering module 106 is disposed in the optical path between the spectrometer 104 output and the detector input 108. The filtering module 106 can employ spatial filtering to remove the spectral noise due to diffraction or destructive interference to remove the first spectral component as well as the spectral noise due to diffraction. Alternatively or additionally, one or more masks can be disposed within the spectrometer 104 to reduce an intensity of the first spectral component or to modify the first spectral component (e.g., change a phase) prior to interaction with other components of the filtering module 106.

The filtering module 106 (with or without masks for the optical train of the spectrometer 104) can be provided as a kit for an existing setup including spectrometer 104 and/or detector 108. In such embodiments, the filtering module 106 can be installed in the existing setup to improve the detection performance of the spectrometry system. Alternatively, the filtering module 106 may be integrated with the spectrometer 104 and/or detector 108 as a new spectrometry setup (e.g., manufactured as a new spectrometer design, with optical components of the filtering module integrated into the optical train of the spectrometer). For example, the optical components of the spectrometer 104 and/or the filtering module 106 may be contained within a common housing and can be considered a unitary spectrometry system.

The setup 100 can optionally include a controller 110 for controlling one or more of the spectrometer 104, the filtering module 106, and the detector 108. For example, the controller 110 can be coupled to the filtering module 106 to control a dimension of the variable dimension spatial filter (e.g., narrow an opening) until a desired reduction in spectral noise is achieved. In such embodiments, the controller 110 may also be coupled to detector 108 to provide feedback. For example, the dimension of the spatial filter can be reduced by the controller 110 until a sufficient reduction in spectral noise is detected by detector 108.

In embodiments, the controller 110 can be coupled to the spectrometer 104, in particular, those masks disposed within the optical train of the spectrometer. The controller 110 can thus control the one or more masks to achieve a desired improvement in detection of the second spectral component. For example, when variable dimension slits are disposed within the spectrometer 104, the controller 110 can vary the slit dimensions until a desired reduction in the first spectral component is achieved at the detector 108.

Figure 2:
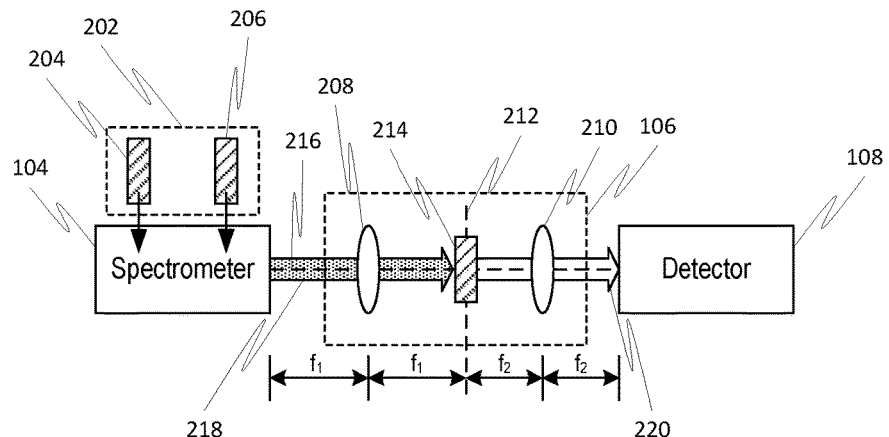
FIG. 2 is a simplified schematic diagram of aspects of spatial filtering to reduce spectral noise in a spectrometry setup, according to one or more embodiments of the disclosed subject matter.

Referring to FIG. 2, an exemplary spectrometry setup with a filtering module 106 employing spatial filtering is shown. A mask module 202, with one or more masks 204, 206, can be installed into an optical train of spectrometer 104. Each mask 204, 206 can be, for example, a variable (or static) dimension slit, a variable (or static) transmission mask, or a locally variable phase/amplitude mask. As discussed in further detail below, the masks 204, 206 of the mask module 202 can be adapted to eliminate (or at least reduce an intensity of) a first spectral component propagating in the spectrometer 104. In some cases, the spectrometer 104 may already contain suitable masks therein, such that a separate mask module 202 would be unnecessary.

The filtering module 106 can be disposed along an optical axis or path 216 between an output (e.g., output plane) of the spectrometer 104 and an input (e.g., input or detection plane) of the detector 108 and is based on frequency domain filtering. For example, the filtering module 106 can include imaging lenses 208, 210 in a 4-f imaging configuration. Thus, the first and second imaging lenses 208, 210 are disposed with respect to the spectrometer output, the detector, and each other based on their respective focal lengths. The first imaging lens 208 has a first focal length, $f_1$, and the second imaging lens 210 has a second focal length, $f_2$, which may be the same or different from the first focal length. The output of the spectrometer 104 is at the first focal length in front of the first imaging lens 208 while the input of the detector 108 is at the second focal length behind the second imaging lens 210.

The first and second imaging lenses 208, 210 are separated from each other by a combination of the first and second focal lengths, with a Fourier plane 212 being at the first focal length behind the first imaging lens 208 and at the second focal length in front of the second imaging lens. 210. A spatial filter 214 is disposed at the Fourier plane 212. As used herein, spatial filter refers to an optical device that alters the structure of light based on Fourier optics. The spatial filter 214 can be a variable dimension aperture, a variable transmission pattern, a fixed aperture, or a fixed mask pattern.

Light 218 from the spectrometer 104 can include the second spectral component to be measured and undesirable spectral noise due to diffraction. The light 218 is focused by the first imaging lens 208 onto the Fourier plane 212 where spatial filter 214 acts to remove (or at least reduce the intensity) of the spectral noise, while allowing the second spectral component to pass through with no (or at least minimal) reduction in intensity. For example, the spatial filter 214 can be an optical stop with a variable diameter central opening. By narrowing a diameter of the central opening, spectral noise due to diffraction can be blocked from passing to the detector 108 as it presents higher spatial frequencies which fall farther away in the Fourier plane, while the second spectral component is allowed to pass through the central opening relatively unaffected. The light 220 passing through the spatial filter 214 is then focused by the second imaging lens 210 onto the input of the detector 108 for subsequent detection.

Although FIG. 2 illustrates a linear configuration for the optical axis 216 and the arrangement of components of the filtering module 106, embodiments of the disclosed subject matter are not limited thereto. Indeed, other configurations are also possible according to one or more contemplated embodiments. For example, light 218 and light 220 can be directed along a tortuous path from spectrometer 104 to detector 108 rather than along a direct linear path 216 by appropriate selection of one or more optical components, such as one or more mirrors.

The above disclosed techniques may be especially relevant in the context of Brillouin scattering measurements, but are not necessarily limited thereto. Brillouin light scattering spectroscopy enables the noninvasive characterization of material properties through the measurement of acoustic phonons. But Brillouin scattering spectroscopy has been challenging from a measurement perspective because it requires both high spectral resolution to resolve optical frequency shifts on the order of 1-10 GHz and high spectral extinction to detect weak spontaneous Brillouin signatures next to non-shifted optical signals (e.g., $10^9$ times stronger than the Brillouin signals). The use of a double-stage virtually imaged phase array (VIPA) dramatically enhances the measurement by parallel spectral detection, which enables collection of the entire Brillouin spectrum at one time with sub-GHz resolution and high throughput efficiency. Although the full spectrum measurement of the Brillouin signal enhances the acquisition process, it also imposes a greater challenge of separating the intense non-shifted signal from the Brillouin signal since they otherwise appear on the same spectrum.

Figure 3:
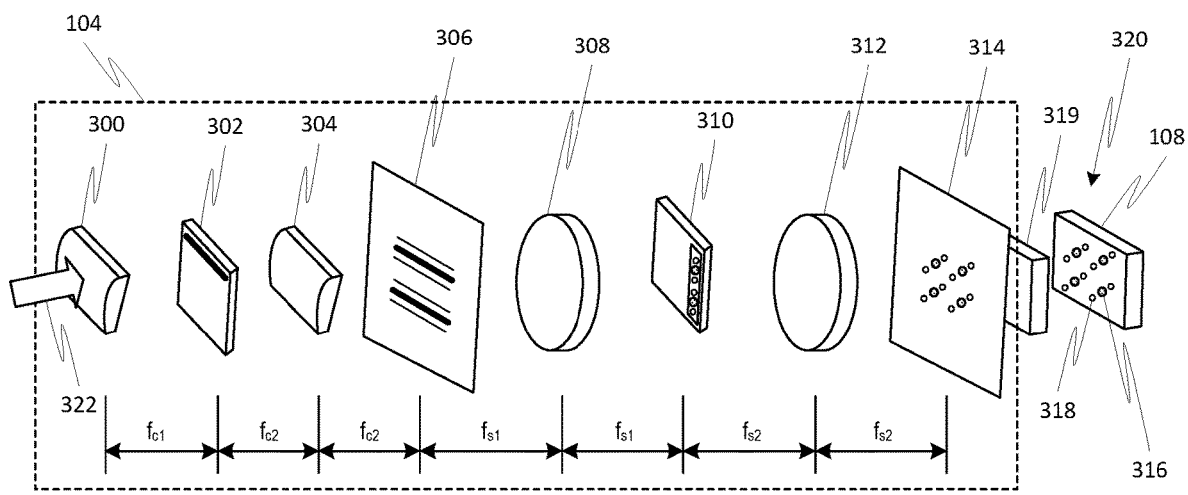
FIG. 3 illustrates a double-stage virtually imaged phase array (VIPA) Brillouin light scattering spectrometer setup that suffers from spectral noise.

FIG. 3 illustrates such a double-stage VIPA Brillouin light scattering spectrometer 104. The spectrometer 104 can include a first cylindrical lens 300 (with focal length $f_{c1}$), which receives light 322 from the sample. The light 322 can include at least a first spectral component 316 (i.e., undesirable) and a second spectral component 318 (i.e., desirable). A first VIPA etalon 302 can be disposed at the focal plane of the first cylindrical lens 300. A second cylindrical lens 304 (with focal length $f_{c2}$) can be disposed behind the first VIPA etalon 302, at a distance equal to the focal length of the second cylindrical lens 304. The first VIPA pattern is thus observed at a focal plane 306 of the second cylindrical lens 304.

The first VIPA pattern at plane 306 is then imaged via a 4-f imaging system and through a second VIPA etalon 310 onto a second focal plane 314 (of a second spherical lens 312). The 4-f imaging system can include a first spherical lens 308 and the second spherical lens 312, with the first spherical lens 308 spaced from the first focal plane 306 based on its focal length, $f_{s1}$. The second VIPA etalon 310 can be spaced from the first spherical lens 308 and from the second spherical lens 312 based on their focal lengths, $f_{s1}$, $f_{s2}$, respectively. The resulting pattern can then be imaged onto detector 108, for example, by imaging system 319 (e.g., a 4-f imaging system with a pair of lenses (not shown), where the focal plane 306, the focal plane 314, and the detector input plane 320 are conjugate planes.

Together, the first and second cylindrical lenses 300, 304, the first and second VIPA etalons 302, 310, and the first and second spherical lenses 308, 312 constitute the optical train of the spectrometer 104. Other optical components beyond those specifically illustrated can also be included in the spectrometer optical train. Moreover, components different than those illustrated can be used in the optical train of the spectrometer, for example, to achieve the same function using different optical components or to provide a spectrometer of a different function (e.g., Raman or Rayleigh-wing scattering or fluorescence spectrometer).

In each stage of the spectrometer 104, the VIPA etalon 302, 304 produces a spectrally dispersed pattern in the focal planes 306, 314 of the respective lenses 304, 312 placed just after the etalons. The spectrally dispersed pattern is the Fourier transform of the electromagnetic field at the output of each VIPA. In a double-stage spectrometer, the two spectral dispersion stages are cascaded orthogonally to each other and the planes 306, 314 of the respective spectrally dispersed patterns are conjugated. The image of the spectrally dispersed pattern is projected onto detector 108 (e.g., CCD camera) by imaging system 319 and a pattern is formed where the Brillouin signals 318 are surrounded by periodic patterns of non-shifted light components 316.

Indeed, in scattering media or close to interfaces, the non-shifted light components include elastically scattered light and laser reflections (i.e., the first spectral component) that are dominant, thereby making the Brillouin-shifted component (i.e., the second spectral component) difficult to detect despite the spatial separation between the different components.

Figure 4:
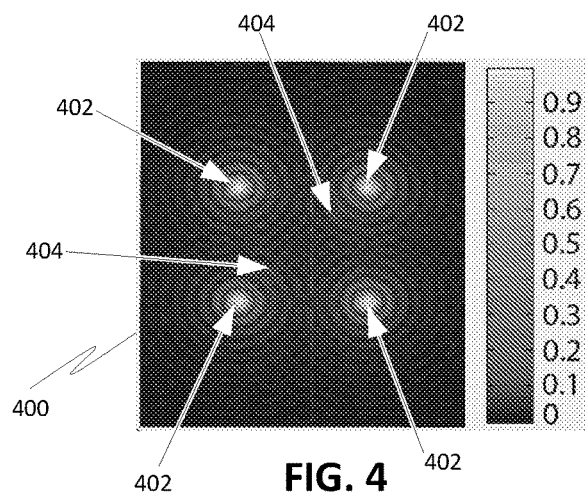
FIG. 4 is a numerical simulation showing Airy patterns and Brillouin signals where a first spectral component dominates a second spectral component in the setup of FIG. 3.

FIG. 4 shows a numerical simulation of an image obtained by the detector 108 in the setup of FIG. 3 when the first spectral component dominates the second spectral component. Due to the periodic output of the spectrometer, four high intensity peaks 402 are present within a given free spectral range. The bright peaks 402 due to the first spectral component are in the corners of the field of view 400, while two vague Brillouin peaks 404, located within the Airy patterns caused by diffraction of the first spectral component, are barely visible in a central region of the field of view 400.

Figure 5:
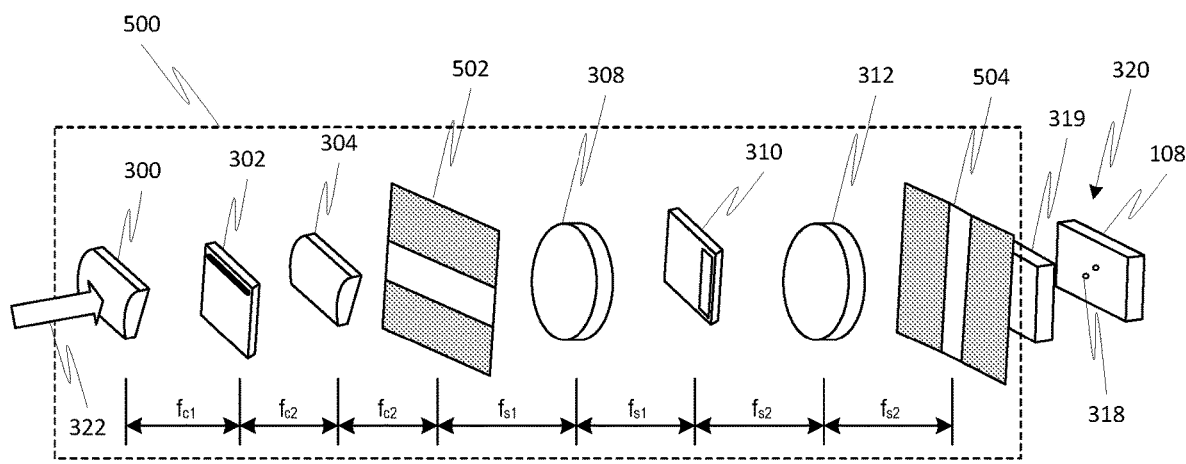
FIG. 5 illustrates a double-stage VIPA Brillouin light scattering spectrometer setup with components in the optical train of the spectrometer to reduce the first spectral component, according to one or more embodiments of the disclosed subject matter.

To remove (or at least reduce the intensity of) the first spectral component, a mask module (including one or more masks) can be added to the optical train of the double-stage VIPA spectrometer. Such a configuration is illustrated in FIG. 5, where spectrometer 500 is similar to spectrometer 104 of FIG. 3 but further includes a first slit mask 502 disposed at the first focal plane 306 and a second slit mask 504 disposed at the second focal plane 314. Because the peaks due to the first spectral component are in the corners of the field of view, the slit masks 502, 504 are designed to block the periphery of the plane, thereby blocking the non-shifted first spectral component from passing to the detector 108.

Although the use of rectangular slit masks is described with respect to FIG. 5, embodiments of the disclosed subject matter are not limited thereto. Other spatial filters can be used and indeed may be necessary depending on the locations of the peaks of the first spectral component with respect to the peaks of the second spectral component.

While the first and second slit masks 502, 504 may be effective to block the geometrical path of the non-shifted first spectral component, the masks 502, 504 are ineffective in removing higher-order spatial frequency components due to light diffraction within the optical train of the spectrometer. Higher-order diffraction components generated by optical elements of the spectrometer are especially significant when high intensity laser light enters the spectrometer. For example, the aforementioned scenario can occur when a Brillouin light scattering measurement is performed close to interfaces between materials of different refractive indices or when Brillouin measurements are performed in turbid (i.e., not clear or transparent) media. This results in strong spectral noise obscuring the Brillouin signal of interest.

Figure 6:
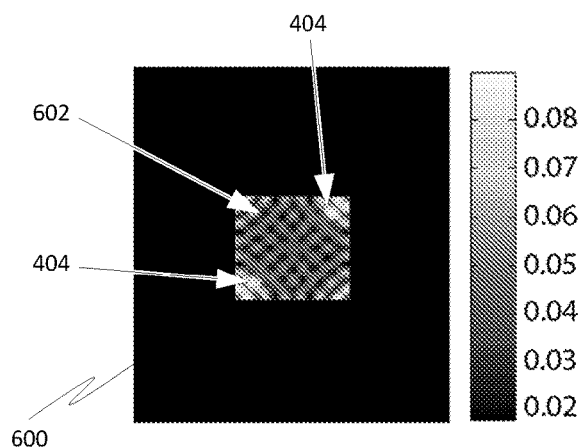
FIG. 6 is a numerical simulation showing the resulting Airy patterns and Brillouin signals after reduction of the first spectral component in the setup of FIG. 5.

FIG. 6 shows a numerical simulation of an image obtained by the detector 108 in the setup of FIG. 5, where the first spectral component has been removed from the detected pattern 600 by slit masks 502, 504 but the spectral noise due to higher order diffraction remains. In particular, high-frequency side lobes 602 typical of the Airy function appear at the boundaries of the blocking masks. Diffraction of the non-shifted first spectral component of the light therefore leads to a significant spectral noise (e.g., intensity up to −35 dB) in the center of the spectrally dispersed pattern, regardless of the spectral performances of the VIPA etalons 302, 310. Under conditions where the first spectral component is dominant (e.g., high back-reflection conditions), this high frequency diffraction pattern 602 can easily overcome and obscure the Brillouin signals 404.

Figure 7:
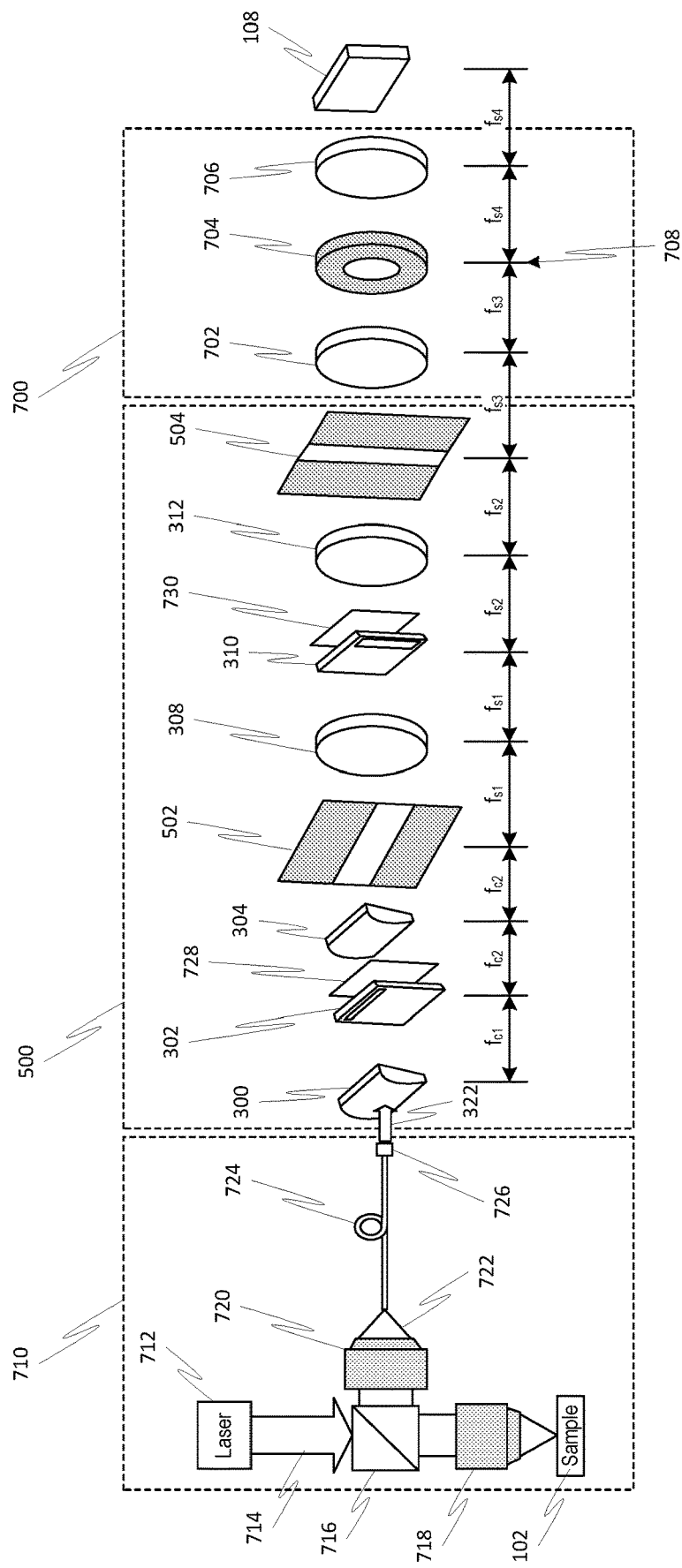
FIG. 7 illustrates a double-stage VIPA Brillouin light scattering spectrometer setup with components in the optical train of the spectrometer to reduce the first spectral component and a filtering module to reduce spectral noise due to diffraction, according to one or more embodiments of the disclosed subject matter.

To effectively measure the second spectral component, embodiments of the disclosed subject matter can include a filtering module to remove (or at least reduce the intensity of) the spectral noise due to diffraction. FIG. 7 illustrates such a configuration, where spectrometer 500 is similar to that of FIG. 5 and a filtering module 700 is introduced at the final segment of the spectrometer 500. The filtering module 700 includes a spatial filter 704 within a 4-f imaging configuration (including first and second spherical lenses 702, 706) that is designed to block the higher-order spatial frequencies generated by diffraction. The spatial filter 704 is located at the Fourier plane 708 of the 4-f imaging configuration and can be, for example, an optical stop having a central diameter that allows light to pass therethrough to the detector 108. After the optical stop 704 in the Fourier plane 708, the high frequencies are blocked such that in the final imaging plane (e.g., at the detector) the faint peaks of the second spectral component can be sufficiently distinguished.

An experimental spectrometry setup according to the configuration of FIG. 7 was built as a Brillouin microscope 710 with a double-stage apodized VIPA spectrometer 500 in order to characterize the performance of the filtering module 700. A single frequency laser beam 714 from a laser source 712 of wavelength 660 nm was expanded. After a beamsplitter 716, the laser beam 714 was focused onto the sample of interest 102 by a microscope objective lens 718 (e.g., a 0.7 NA lens having a 60× magnification). In an epi-detection configuration, the light 722 scattered from the sample 102 was collected by the microscope objective lens 718 and coupled into a single mode fiber 724 via the beam splitter 716 and another objective lens 720. An output end of the single mode fiber 724 can include a lens 726 for directing and/or collimating the light 722 from the sample 102 into the spectrometer 500.

Using the first cylindrical lens 300 (e.g., having a focal length, $f_{c1}$, of 200 mm), the light 322 from the sample, which has both first and second spectral components, was focused onto the first VIPA etalon 302, which was tilted in the vertical direction. An optional gradient neutral density filter 728 was disposed at an output of the first VIPA etalon 302 to provide apodization and shaping of the VIPA output pattern. A second cylindrical lens 304 (e.g., having a focal length, $f_{c2}$, of 200 mm) was then used to focus the output of the first VIPA etalon 302 and obtain a spectrally dispersed pattern in the focal plane of the second cylindrical lens 304, i.e., at the location of the first slit mask 502 which blocks a portion of the non-shifted first spectral component.

The process was then repeated using another spectral dispersion stage (i.e., second stage) in the horizontal direction. Thus, the pattern transmitted through the first slit mask 502 was focused onto a second VIPA etalon 310, which was tilted in the horizontal direction, by a first spherical lens 308 (e.g., having a focal length, $f_{s1}$, of 200 mm). Another optional gradient neutral density filter 730 was disposed at an output of the second VIPA etalon 310 to provide apodization and shaping of the VIPA output pattern. A second spherical lens 312 (e.g., having a focal length, $f_{s2}$, of 200 mm), was used to focus the output of the second VIPA etalon 310 and obtain a spectrally dispersed pattern in the focal plane of the second spherical lens 312, i.e., at the location of the second slit mask 504, which blocks the remaining portion of the non-shifted first spectral component.

The second stage of the spectrometer 500 behaves as an imaging system for the vertically dispersed pattern and the second VIPA etalon 310 is in the infinity space of the imaging system formed by the first and second spherical lenses 308, 312. After the second stage of the spectrometer 500 and prior to the detector 108, the filtering module 700 was inserted and had two identical spherical lenses 702, 706 (e.g., having focal lengths, $f_{s3}$ and $f_{s4}$, of 30 mm) along with an optical stop 704 of variable aperture in the Fourier plane 708. The optical stop 704 served as a low-pass spatial filter, removing the diffraction patterns that would otherwise obscure detection of the second spectral component.

Figure 8:
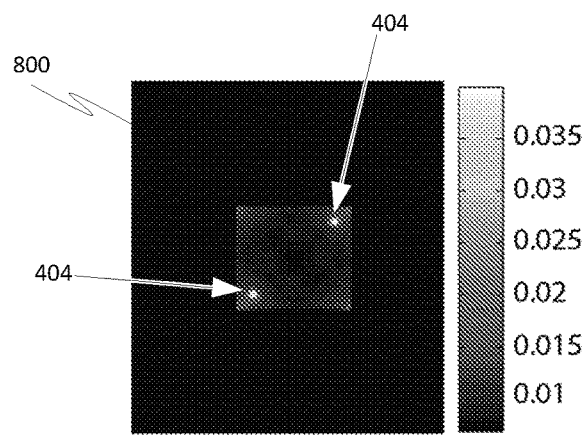
FIG. 8 is a numerical simulation showing the resulting Brillouin signals after reduction of the first spectral component and the spectral noise due to diffraction in the setup of FIG. 7.

FIG. 8 shows a numerical simulation of an image obtained by the detector 108 in the setup of FIG. 7, where the first spectral component and the spectral noise due to diffraction have both been removed from the detected pattern 800. In the absence of the diffraction patterns, the faint signals of the second spectral component 404 (i.e., the Brillouin scattered light) can be readily distinguished and measured.

To further demonstrate the ability of the disclosed methods to more effectively measure second spectral components and remove spectral noise, the setup of FIG. 7 was used to interrogate the interface between a cuvette (having a refractive index of approximately 1.58) and water contained therein (having a refractive index of approximately 1.33). The data was obtained using 27 mW laser power at the sample and 100 ms integration time for the detector 108. The back reflection from the interface was measured to be about 0.7%.

Figures 9A, 9B:
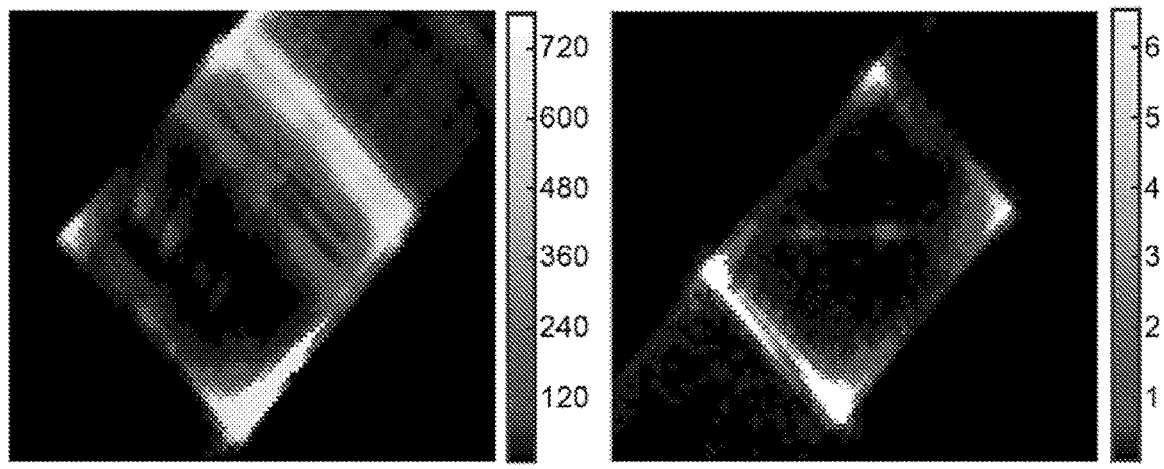
FIG. 9A is an image of the detected signals from an interface in a sample, without spatial filtering employed in a double-stage VIPA Brillouin light scattering spectrometer setup, showing the dominance of the spectral noise due to diffraction.
FIG. 9B is an image of the detected signals from an interface in a sample, with spatial filtering employed in a double-stage VIPA Brillouin light scattering spectrometer setup to eliminate spectral noise, according to one or more embodiments of the disclosed subject matter.
Figure 9C:
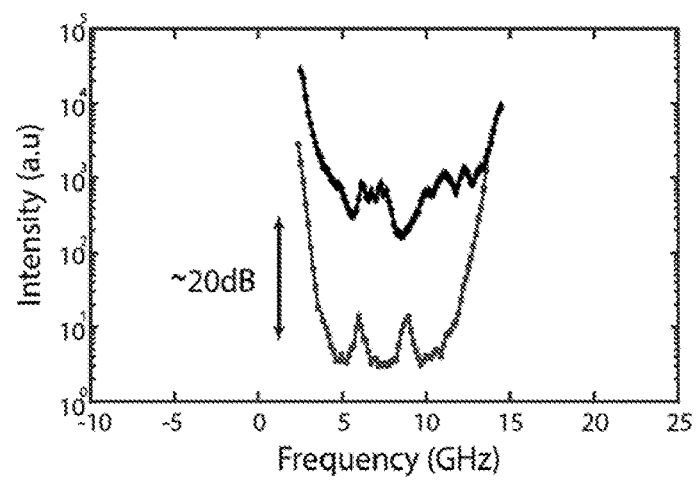
FIG. 9C is an average line plot of the signal widths in FIG. 9A (top line) and FIG. 9B (bottom line), demonstrating a 20 dB reduction in spectral noise.

When the variable aperture of the optical stop 704 is held in an open position (i.e., insufficiently narrow to remove the spectral noise), the Brillouin signal was obscured by the spectral noise, as illustrated in FIG. 9A. However, when the variable aperture of the optical stop 704 was narrowed, the spectral noise was removed and the Brillouin signal was more clearly detected in the center of the field of view, as illustrated in FIG. 9B. FIG. 9C plots the line averages over the width of the respective signals of FIGS. 9A and 9B. Note that a 20 dB reduction in spectral noise is achieved by the optical stop setting underlying FIG. 9B as compared to the optical stop setting underlying FIG. 9A.

When employing a variable aperture optical stop 704 as the spatial filter, the size of the aperture can determine the level of spectral noise reduction. Considering a one-dimensional VIPA pattern focused to the Fourier plane by a lens, the VIPA generates a repetitive Lorentzian pattern that can be denoted by V(x). In the Fourier plane, this pattern is convolved with the Fourier transform of the lens aperture yielding V(x)*Sin c(x). At this plane, the center of the Sinc function is blocked by the slit mask (e.g., mask 502 or 504), and then Fourier transformed again onto the variable aperture optical stop (e.g., stop 704). Although a Sinc function or Airy function are composed out of multiple periodicities, its residual approaches a single frequency pattern with periodicity of $W^{-1}$, where W is diffracting aperture width. As the central part of the pattern is blocked, a vast amount of energy is shifted toward the edges of the Fourier plane. The optical stop at the Fourier plane is thus designed to block the high frequencies, and smaller apertures will reduce more of the spectral noise.

The efficiency of the noise reduction can thus depend on the aperture diameter of the optical stop 704 relative to the size of the diffracting aperture. To quantify this behavior within the setup of FIG. 7, the aperture size of the optical stop 704 was varied and the resulting pattern was recorded by the detector 108. Each recorded pattern was then analyzed by measuring the light intensity level in the central region of the pattern between the two Brillouin peaks. The spectral noise was determined as the average value of the thirty pixels at the center of pattern.

Figure 10A:
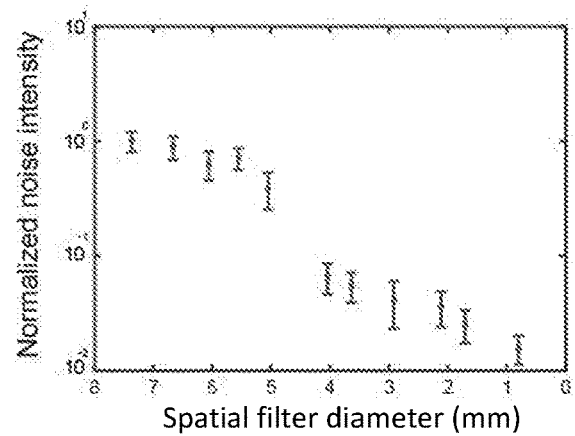
FIG. 10A is a graph of detected spectral noise intensity versus aperture diameter of the spatial filter in the setup of FIG. 7.

FIG. 10A shows the experimental results, where the error bars represent the standard deviation over the central region.

Figure 10B:
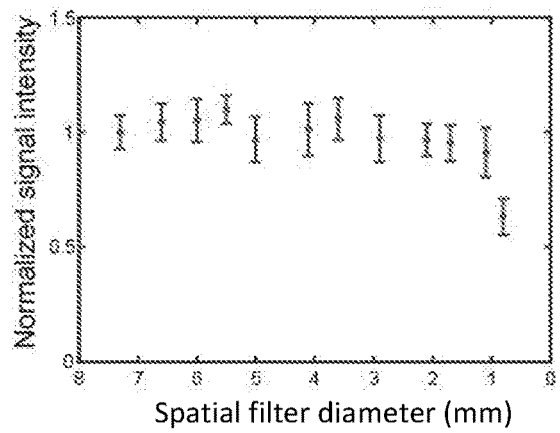
FIG. 10B is a graph of detected Brillouin signal intensity versus aperture diameter of the spatial filter in the setup of FIG. 7.

As illustrated in FIG. 10A, for large diameter apertures of the optical stop 704, there is no discernible reduction in spectral noise. As the aperture diameter of the optical stop 704 decreases, there is a sharp drop in the intensity of the spectral noise (i.e., around 4-5 mm), followed by a slow monotonic decline with further decreases in aperture diameter. This behavior is based on the Airy pattern of the spectral noise caused by diffraction. Once the peak of the Airy function is physically blocked by the optical stop, the remaining portion of the Airy function is a series of diffraction "rings," i.e., intensity peaks and valleys that repeat with a nearly constant period. In the Fourier plane where the optical stop 704 is inserted, the spectral noise due to diffraction has a dominant spatial frequency at a given radius from the center, corresponding to the period of the residual Airy diffraction rings. As long as the diameter of the aperture of the optical stop 704 is sufficiently large to allow this dominant spatial frequency to pass through, the reduction in spectral noise at the detector is relatively small. However, once the diameter of the aperture of the optical stop 704 is sufficiently small to block this dominant spatial frequency from passing, a large drop in spectral noise at the detector is observed. Once the dominant spatial frequency has been eliminated, only a moderate further decrease in spectral noise is achieved by further reducing the diameter of the aperture of the optical stop 704 to block the less dominant lower spatial frequency components of the Airy pattern. However, the reduction of the diameter of the aperture of the optical stop 704 to remove the spectral noise does not otherwise affect the intensity of the second spectral component (i.e., the measured Brillouin signal), as shown in FIG. 10B. Note that the error bars represent the standard deviation of twenty-five repeated measurements of the Brillouin peak intensity.

Although the discussion above has focused on the use of spatial filtering to remove the spectral noise due to diffraction, embodiments of the disclosed subject matter are not limited thereto. Alternatively or additionally, a filtering module can be provided that employs destructive interference to remove (or at least reduce the intensity of) the first spectral component and/or the spectral noise resulting from diffraction of the first spectral component.

Figure 11:
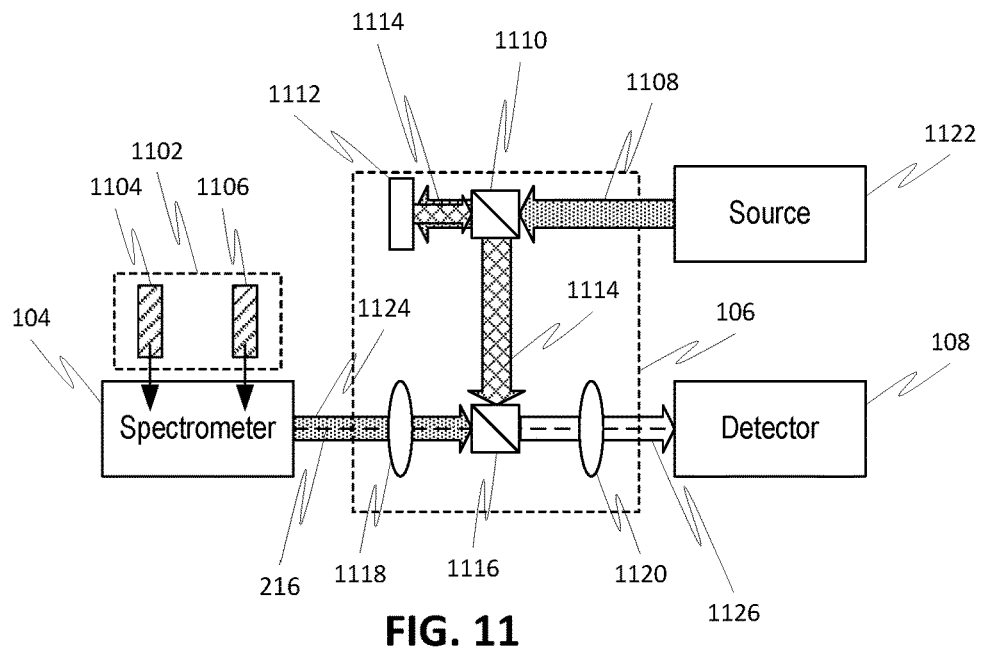
FIG. 11 is a simplified schematic diagram of aspects of the use of interference to reduce spectral noise in a spectrometry setup, according to one or more embodiments of the disclosed subject matter.

Referring to FIG. 11, an exemplary spectrometry setup with a filtering module 106 employing destructive interference is shown. A mask module 1102, with one or more masks 1104, 1106, can be installed into an optical train of spectrometer 104. Each mask 1104, 1106 can be, for example, a locally variable phase/amplitude mask. As discussed in further detail below, the masks 1104, 1106 can be adapted to modify (e.g., introduce a phase delay) at least the first spectral component and/or any diffraction of the first spectral component. In some cases, the spectrometer 104 may already contain suitable masks therein, such that a separate mask module 1102 is unnecessary.

The filtering module 106 can be disposed with at least a portion thereof along an optical axis or path 216 between an output (e.g., output plane) of the spectrometer 104 and input (e.g., input or detection plane) of the detector 108 and is based on the use of destructive interference. For example, the filtering module 106 can include imaging lenses 1118, 1120, which may be in a 4-f imaging configuration. Thus, the first and second imaging lenses 1118, 1120 are disposed with respect to the spectrometer output plane, the detector, and each other based on their respective focal lengths, as in the configuration of FIG. 2. A beam splitter 1116 may be disposed between the first and second imaging lenses 1118, 1120, and may be at the Fourier plane or at a location different from the Fourier plane.

Light 1108, including a first spectral component, from a source 1122 is used to interrogate a sample (not shown). A portion of light 1108 is directed via a beam splitter 1110 to a phase/amplitude modulator 1112, where it is modified (e.g., phase changed) and reflected back to the beam splitter 1110. For example, the phase/amplitude modulator 1112 can be a spatial light modulator. The modified light 1114 having the first spectral component is then combined at beam splitter 1116 with output light 1124 from the spectrometer, which light 1124 has the second spectral component, spectral noise due to diffraction, and the first spectral component. The phased change induced by the phase/amplitude modulator 1112 is controlled such that destructive interference is produced at beam splitter 1116 to remove (or at least reduce an intensity of) the first spectral component and spectral noise from diffraction thereof. The resulting light 1126 passing to the detector 108 has the first spectral component and spectral noise due to diffraction removed by the destructive interference, leaving only the second spectral component for detection.

Although FIG. 11 illustrates a linear configuration for the optical axis 216 and the arrangement of components of the filtering module 106, embodiments of the disclosed subject matter are not limited thereto. Indeed, other configurations are also possible according to one or more contemplated embodiments. For example, light 1124 and light 1126 can be directed along a tortuous path from spectrometer 104 to detector 108 rather than along a direct linear path 216 by appropriate selection of one or more optical components, such as one or more mirrors. Moreover, although FIG. 11 illustrates specific optical components for the filtering module 106 and the mask module 1102, embodiments of the disclosed subject matter are not limited thereto. Indeed, one of ordinary skill in the art will readily be able to select optical components other than those illustrated to achieve the disclosed destructive interference to remove the spectral noise due to diffraction and/or remove the first spectral component, based on the principles disclosed herein.

Figure 12:
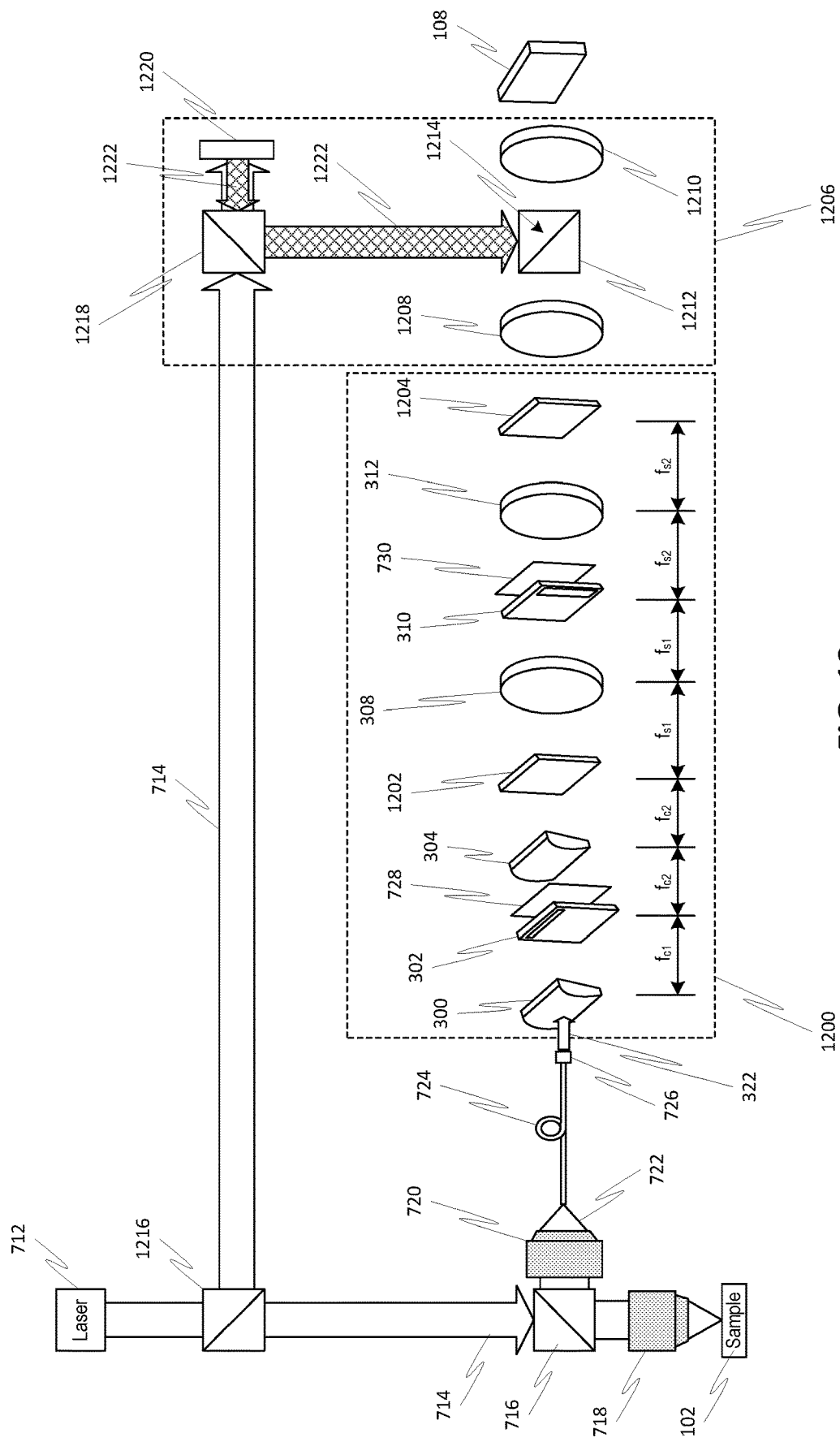
FIG. 12 illustrates a double-stage VIPA Brillouin light scattering spectrometer setup with a filtering module that uses interference to reduce the first spectral component and/or spectral noise due to diffraction, according to one or more embodiments of the disclosed subject matter.

Similar to the filtering module employing spatial filtering, a filtering module employing destructive interference may be especially relevant in the context of Brillouin scattering measurements. FIG. 12 illustrates a setup of a double-stage VIPA Brillouin light scattering spectrometer similar to that of FIG. 7 but with a filtering module 1206 employing destructive interference. As such, the slit masks 502, 504 of FIG. 7 are replaced with locally variable phase/amplitude masks 1202, 1204, respectively. These masks 1202, 1204 are designed to produce a phase delay of 180° only at the locations of the first spectral component (i.e., at the periphery of the respective focal planes).

A beam splitter 1216 diverts a portion of the interrogating light 714 (i.e., the first spectral component) to the filtering module 1206 for use in producing the destructive interference to remove the first spectral component and/or spectral noise due to diffraction. The interrogating light 714 is directed to a phase/amplitude modulator 1220 (e.g., spatial light modulator) via beam splitter 1218, where it is modified (subject to spatially varying modulation, e.g., phase change) and reflected by the phase/amplitude modulator 1220. The modified input light 1222 is then directed to beam splitter 1214 (i.e., at an imaging plane) via beam splitter 1218. The phase change produced by the phase/amplitude modulator 1220 can be varied to produce destructive interference only with light from the spectrometer that has experienced a phase delay by masks 1202, 1204, i.e., the first spectral component and any diffraction resulting from the first spectral component. As a result, the non-shifted interrogating light 714 as well as any residual diffraction can be removed (or at least reduced in intensity) by the destructive interference. An iterative algorithm can be applied to the locally variable phase/amplitude masks 1202, 1204 and/or the phase/amplitude modulator 1220 in order to optimize (or at least improve) noise reduction.

Figure 13A:
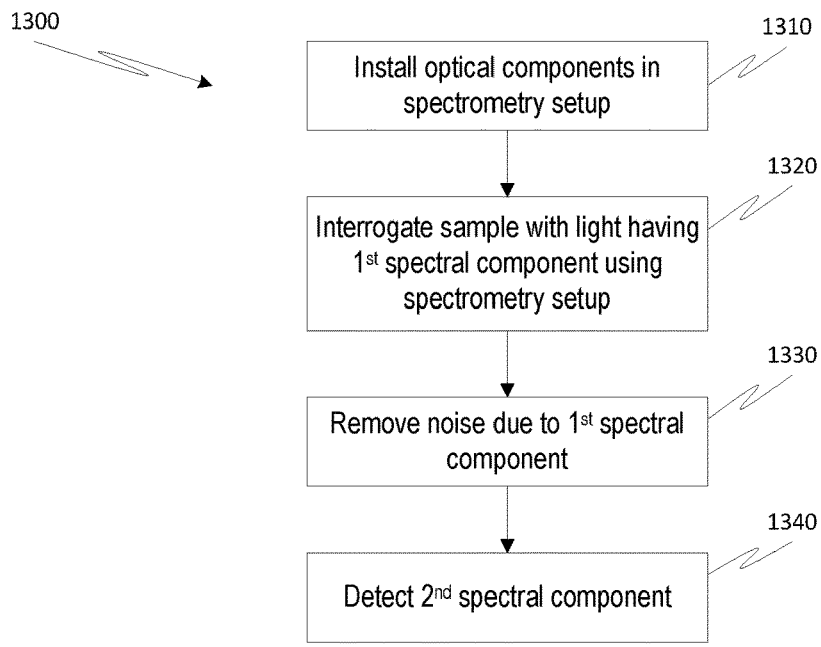
FIG. 13A is a high-level process flow diagram for a spectrometry method with reduced spectral noise, according to one or more embodiments of the disclosed subject matter.

Thus, in one or more embodiments, spatial filtering or interference can be used to improve the detection of a second spectral component when a first spectral component is otherwise dominant. Referring to FIG. 13A, a process flow diagram is shown for a generalized method 1300 for improving the detection of the second spectral component. The method 1300 can include, at 1310, installing the necessary optical components in a spectrometry setup. In existing spectrometry setups, the optical components can be provided as a separate kit for modification thereof. Alternatively, the optical components may be incorporated into the manufacture of a new spectrometry setup. Depending on the mechanism selected for reduction of the first spectral component and associated spectral noise due to diffraction, the optical components installed may be different and are discussed in further detail herein. Similarly, the configuration of the spectrometry setup will depend on the type of measurement desired, such as, but not limited to Brillouin light scattering, Raman, Rayleigh-wing scattering or fluorescence spectrometry.

Once the optical components are installed, the method 1300 can include, at 1320, analyzing a sample by directing interrogating light having a first spectral component to the sample, capturing emitted light having a second spectral component from the sample, and directing the captured light to the spectrometer. Using the installed optical components, at 1330, discrimination of the second spectral component can be improved by removing noise components that obscure the second spectral component, such as the first spectral component and/or spectral noise caused by diffraction of the first spectral component. As a result, at 1340, the second spectral component can be detected by a detector.

Figure 13B:
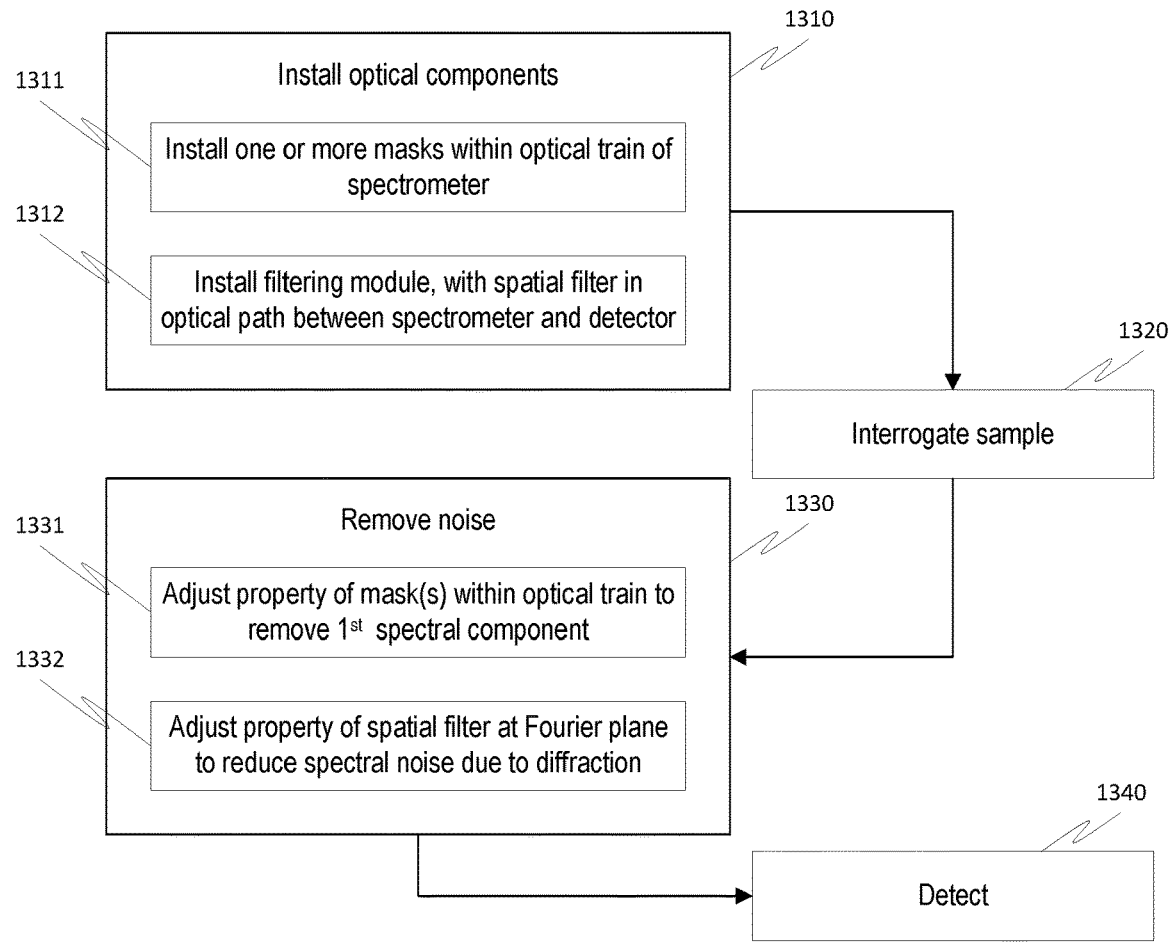
FIG. 13B is a process flow diagram that specifies details related to spatial filtering to remove a first spectral component and/or spectral noise due to diffraction in the process flow of FIG. 13A, according to one or more embodiments of the disclosed subject matter.

FIG. 13B represents an adaptation of the generalized method 1300 of FIG. 13A to the use of spatial filtering to improve detection of the second spectral component. For example, the installation of optical components 1310 can optionally include, at 1311, the installation of one or more masks within the optical train of the spectrometer. For example, each mask can be a variable (or static) dimension slit, a variable (or static) transmission mask, or a locally variable phase/amplitude mask and can be disposed at focal plane locations, as discussed above with respect to FIGS. 2, 5, and 7. As such, the masks can be adapted to eliminate (or at least reduce an intensity of) the first spectral component propagating in the spectrometer 104. In some embodiments, the spectrometer 104 may already contain suitable masks therein, such that installation 1311 would be unnecessary.

The installation of optical components 1310 can optionally include, at 1312, the installation of a filtering module, including a spatial filter, in the optical path between an output of the spectrometer and an input of the detector. For example, the filtering module can be the filtering module 106 as described above with respect to FIG. 2 or the filtering module 700 as described above with respect to FIG. 7. In some embodiments, installation of the masks 1311 may occur without installation of the filtering module 1312. In other embodiments, installation of the filtering module 1312 may occur without installation of the masks 1311. In still other embodiments, installation of the filtering module 1312 and installation of the masks 1311 both occur.

For example, removing noise 1330 can optionally include, at 1331, adjusting a property of one or more of the masks installed within the optical train in order to remove (or at least reduce an intensity of) the first spectral component. For example, the adjusting can include varying a dimension of an aperture or slit of the mask, changing a phase delay induced by the mask, or otherwise modifying a transmission characteristic of the mask. In those embodiments where a particular configuration or property of the mask has already been determined for optimal removal of the first spectral component, the adjusting may not be necessary or a mask with a fixed property (e.g., static) can be used. In such embodiments, the one or more masks are simply used at 1331 to remove the first spectral component without any adjusting.

The removing noise 1330 can optionally include, at 1332, adjusting a property of the spatial filter at the Fourier plane in order to remove (or at least reduce an intensity of) spectral noise due to diffraction of the first spectral component. For example, the adjusting can include varying a dimension of an aperture of the spatial filter (e.g., an optical stop) or otherwise modifying a transmission characteristic of the spatial filter. In those embodiments where a particular configuration or property of the spatial filter has already been determined for optimal removal of the spectral noise, the adjusting may not be necessary or a spatial filter with a fixed property (e.g., static) can be used. In such embodiments, the spatial filter is simply used at 1332 to remove the spectral noise due to diffraction without any adjusting.

In some embodiments, adjusting/use of masks to remove the first spectral component 1331 may occur without adjusting/use of the spatial filter to remove the spectral noise 1332. In other embodiments, adjusting/use of the spatial filter to remove the spectral noise 1332 may occur without adjusting/use of masks to remove the first spectral component 1331. In still other embodiments, adjusting/use of masks to remove the first spectral component 1331 and adjusting/use of the spatial filter to remove the spectral noise 1332 both occur.

Figure 13C:
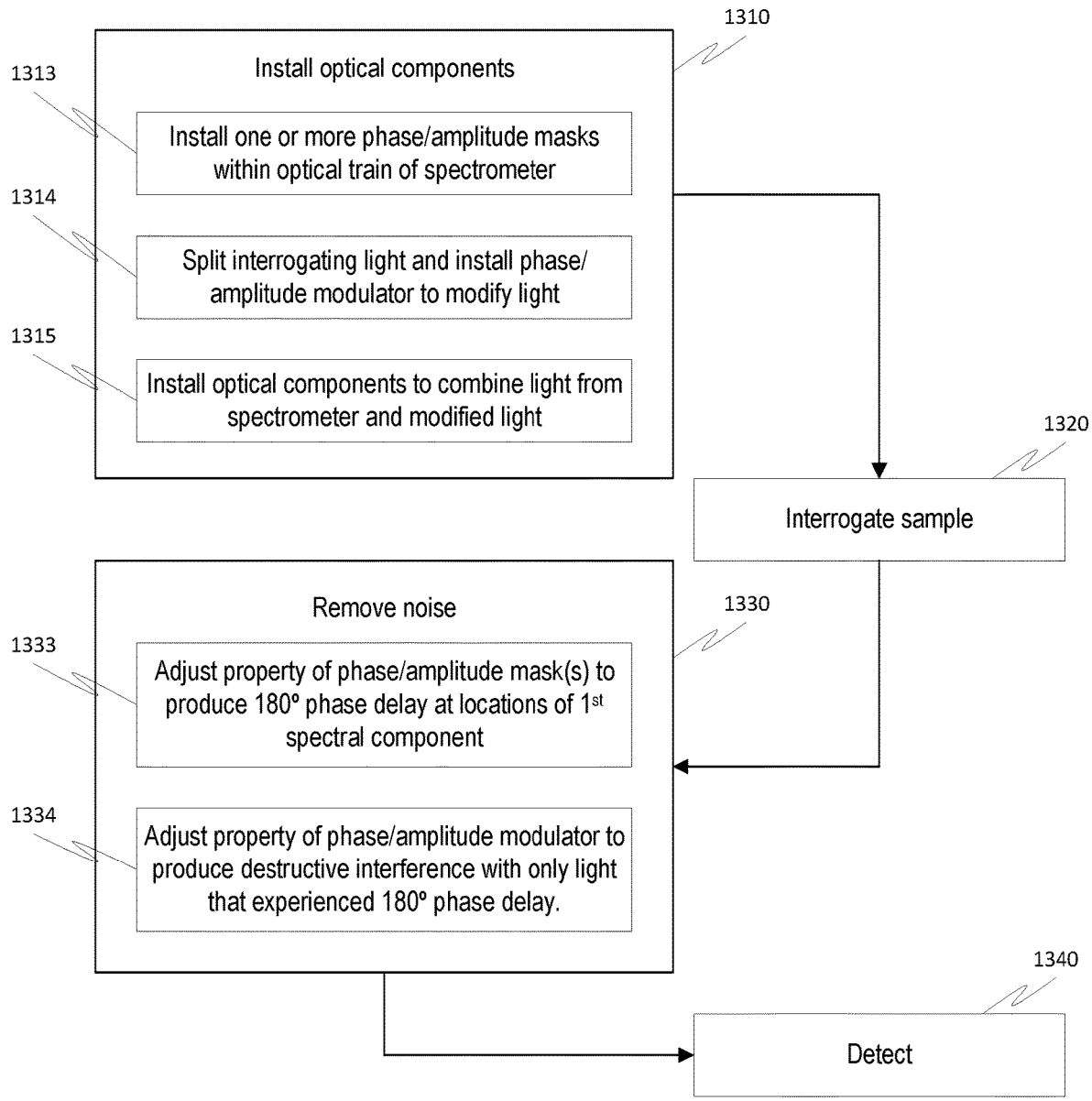
FIG. 13C is a process flow diagram that specifies details related to removing a first spectral component and/or spectral noise due to diffraction using interference in the process flow of FIG. 13A, according to one or more embodiments of the disclosed subject matter.

FIG. 13C represents an adaptation of the generalized method 1300 of FIG. 13A to the use of interference to improve detection of the second spectral component. For example, the installation of optical components 1310 can optionally include, at 1313, the installation of one or more masks within the optical train of the spectrometer. For example, each mask can be a locally variable phase/amplitude mask and disposed at focal plane locations, as discussed above with respect to FIGS. 11 and 12. As such, the masks can be adapted to modify at least the first spectral component, for example, by introducing a phase delay only at location where the first spectral component is present. In some embodiments, the spectrometer 104 may already contain suitable masks therein, such that installation 1313 would be unnecessary.

The installation of optical components 1310 can optionally include, at 1314, the installation of optical components, such as beam splitters and a phase/amplitude modulator (e.g., spatial light modulator), to split and modify the interrogating light. For example, the optical components can be aspects of the filtering module 106 as described above with respect to FIG. 11 or aspects of the filtering module 1206 as described above with respect to FIG. 12. In some embodiments, the spectrometry setup may already contain suitable optical components, such as beam splitters, so that installation 1314 of at least some of the optical components would be unnecessary.

The installation of optical components 1310 can optionally include, at 1315, the installation of optical components, such as beam splitters, to combine light from the spectrometer and the modified input light. For example, the optical components can be aspects of the filtering module 106 as described above with respect to FIG. 11 or aspects of the filtering module 1206 as described above with respect to FIG. 12. In some embodiments, installation of the masks 1313 may occur without installation of the other optical components 1314, 1315. In other embodiments, installation of the other optical components 1314, 1315 may occur without installation of the masks 1313. In still other embodiments, installation of the optical components 1314, 1315 and installation of the masks 1313 all occur.

For example, the removing noise 1330 can optionally include, at 1333, adjusting a property of the one or more phase/amplitude masks to modify the first spectral component propagating through the spectrometer. For example, the adjusting can include changing a transmission characteristic of the mask to introduce a phase delay (e.g., 180°) only at locations of the first spectral component (e.g., at the periphery of the focal planes). In those embodiments where a particular configuration or property of the phase/amplitude masks has already been determined for optimal removal of the first spectral component and associated spectral noise, the adjusting may not be necessary or a mask with a fixed property (e.g., static) can be used. In such embodiments, the phase/amplitude masks are simply used at 1333 without any adjusting.

The removing noise 1330 can further include, at 1334, adjusting a property of the phase/amplitude modulator to produce destructive interference between the modified input light and the light from the spectrometer. For example, the phase/amplitude modulator can be adjusted to spatially modify the phase of the input light, such that destructive interference only occurs between the modified input light and light from the spectrometer that has experienced the phase delay from the phase/amplitude masks, i.e., the first spectral component and associated spectral noise due to diffraction. In those embodiments where a particular configuration or property of phase/amplitude modulator has already been determined for optimal removal of the spectral noise, the adjusting may not be necessary or a phase/amplitude modulator with a fixed state (e.g., static) can be used. In such embodiments, the phase/amplitude modulator is simply used at 1334 to produce destructive interference, thereby removing the first spectral component and the spectral noise due to diffraction without any adjusting.

The above described systems and methods can allow the measurement of a relatively low intensity spectral component that would otherwise be obscured by a relatively high intensity spectral component. For example, in conventional Brillouin scattering spectrometry systems, dominance of interrogating light presents a challenge in measuring signals within scattering materials and near interfaces in a sample. To overcome such limitations, the sample of interest can be embedded within an index matching material. But such techniques are unavailable for samples of varying indices of refraction or when dealing with real in vivo scenarios, such as characterizing mechanical properties of cells attached to a glass substrate or measuring the stiffness at the surface of biological tissues, such as the skin or cornea. Embodiments of the disclosed subject matter overcome the above noted limitations by removing spectral noise due to the dominant first spectral component, thereby allowing for the measurement of samples without any index matching material.

Although the above description has focused on Brillouin light scattering spectrometers, embodiments of the disclosed subject matter are not limited thereto. Indeed, as discussed above, the techniques discussed herein can be applied to any grating-based or etalon-based spectrometry system, such as, but not limited to, a Raman or Rayleigh-wing scattering or fluorescence spectrometer (where the second spectral component is Raman or Rayleigh-wing scattered light or fluorescence light from the sample). Moreover, although particular optical components have been illustrated in the figures and discussed in detail herein, embodiments of the disclosed subject matter are not limited thereto. Indeed, one of ordinary skill in the art will readily appreciate that different optical components can be selected and/or optical components added to provide the same effect.

In one or more first embodiments, a method comprises reducing spectral noise caused by a first spectral component propagating through an optical train of a spectrometer by spatial filtering or interference between an output plane of the spectrometer and a detector, and detecting at the detector a second spectral component passing through the optical train of the spectrometer. The second spectral component can have a wavelength different from that of the first spectral component.

In the first embodiments, or any other embodiment, the first spectral component has an intensity that is at least 10 times greater than the second spectral component. In the first embodiments, or any other embodiment, the wavelength and the intensity of the first spectral component are different than the wavelength and the intensity of the second spectral component, respectively.

In the first embodiments, or any other embodiment, the spectral noise is caused by diffraction due to the first spectral component propagating through the optical train of the spectrometer.

In the first embodiments, or any other embodiment, the spectral noise is reduced by a filtering module that produces said spatial filtering or interference, and at least a portion of the filtering module is disposed between the output plane of the spectrometer and the detector. In the first embodiments, or any other embodiment, the method further comprises reducing an intensity or changing a phase of the first spectral component prior to the output plane of the spectrometer. In the first embodiments, or any other embodiment, the reducing an intensity or changing a phase of the first spectral component comprises using one or more masks within the optical train of the spectrometer to block light or modify (e.g., spatially change a phase) of light. In the first embodiments, or any other embodiment, each mask comprises a variable dimension slit, a variable transmission mask, or a locally variable phase/amplitude mask. In the first embodiments, or any other embodiment, respective locations of the one or more masks are based on conjugate planes of the optical train of the spectrometer and the filtering module.

In the first embodiments, or any other embodiment, the spectrometer is a grating-based or etalon-based spectrometer. In the first embodiments, or any other embodiment, the spectrometer is a Raman or Rayleigh-wing scattering or fluorescence spectrometer. In the first embodiments, or any other embodiment, the second spectral component is Raman or Rayleigh-wing scattered light or fluorescence light from the sample and has a wavelength shifted from that of the first spectral component. In the first embodiments, or any other embodiment, the spectrometer is a Brillouin light scattering spectrometer. In the first embodiments, or any other embodiment, the Brillouin light scattering spectrometer is a single-stage or double-stage virtually imaged phased array (VIPA) spectrometer. In the first embodiments, or any other embodiment, the first spectral component comprises input light reflected, scattered or diffused from a sample directly into the spectrometer. In the first embodiments, or any other embodiment, the second spectral component is Brillouin scattered light from the sample and has a wavelength shifted from that of the first spectral component.

In the first embodiments, or any other embodiment, the filtering module has a 4f imaging configuration, with a first lens having a first focal length, a second lens having a second focal length, the output plane of the spectrometer being at the first focal length in front of the first lens, an input plane of the detector being at the second focal length behind the second lens, and a Fourier plane being at the first focal length behind the first lens and at the second focal length in front of the second lens. In the first embodiments, or any other embodiment, a spatial filter is disposed at the Fourier plane. In the first embodiments, or any other embodiment, the spatial filter comprises a variable dimension aperture, a variable transmission pattern, a fixed aperture, or a fixed mask pattern. In the first embodiments, or any other embodiment, the spatial filter comprises a variable aperture, and a dimension of the variable aperture is narrowed in order to reduce the spectral noise. In the first embodiments, or any other embodiment, the first spectral component and/or spectral noise induced by the first spectral component is disposed farther away in the Fourier plane (e.g., from a center of the Fourier plane or an optical axis of the spatial filter) than the second spectral component.

In the first embodiments, or any other embodiment, an interference pattern is generated by the filtering module based on light interrogating the sample using a phase/amplitude modulator, the interference pattern being effective to reduce the spectral noise caused by diffraction and/or to remove the first spectral component. In the first embodiments, or any other embodiment, the phase/amplitude modulator is a spatial light modulator. In the first embodiments, or any other embodiment, the interference pattern is generated within the portion of the filtering module between the spectrometer and the detector. In the first embodiments, or any other embodiment, the reducing an intensity or changing a phase of the first spectral component comprises using one or more masks within the optical train of the spectrometer to modulate the interference pattern. In the first embodiments, or any other embodiment, each mask comprises a locally variable phase/amplitude mask.

In the first embodiments, or any other embodiment, prior to the reducing, at least the filtering module is installed between the spectrometer and the detector of an existing spectrometry setup. In the first embodiments, or any other embodiment, prior to the reducing, at least the spectrometer and filtering module are installed, designed, or formed as part of a common or unitary spectrometry setup.

In the first embodiments, or any other embodiment, the detecting the second spectral component provides a measurement of an interface between materials of different refractive indices. In the first embodiments, or any other embodiment, the detecting is performed without use of index-matched materials with the sample or sample tilting.

In one or more second embodiments, a system comprises a spectrometer, a detector, and a filtering module. The spectrometer can have an optical train (e.g., including one or more lenses (e.g., cylindrical, spherical, etc.), one or more mirrors, one or more beam splitters, one or more gratings, one or more etalons, one or more masks, and/or one or more filters). The filtering module is constructed to produce spatial filtering or interference of light so as to reduce spectral noise caused by light propagating through the optical train of the spectrometer prior to being detected by the detector.

In the second embodiments, or any other embodiment, the filtering module is constructed to reduce spectral noise caused by diffraction of a first spectral component of the light propagating through the optical train of the spectrometer.

In the second embodiments, or any other embodiment, the spectrometer comprises a grating-based or etalon-based spectrometer. In the second embodiments, or any other embodiment, the spectrometer comprises at least one of a Brillouin light scattering spectrometer, a Raman spectrometer, or a Rayleigh-wing scattering or fluorescence spectrometer. In the second embodiments, or any other embodiment, the spectrometer is a single-stage or double-stage virtually imaged phased array (VIPA) Brillouin light scattering spectrometer.

In the second embodiments, or any other embodiment, the spectrometer includes one or more masks disposed within the optical train of the spectrometer and constructed to block light. In the second embodiments, or any other embodiment, respective locations of the one or more masks are based on conjugate planes of the optical train of the spectrometer and the filtering module. In the second embodiments, or any other embodiment, each mask comprises a variable (or static) dimension slit, a variable (or static) transmission mask, or a locally variable (or static) phase/amplitude mask.

In the second embodiments, or any other embodiment, the system further comprises a controller configured to adjust a property of each mask to reduce one or more spectral components prior to the filtering module. In the second embodiments, or any other embodiment, at least a portion of the filtering module is disposed between an output plane of the spectrometer and an input plane of the detector.

In the second embodiments, or any other embodiment, the filtering module comprises a first lens and a second lens. The first lens can have a first focal length, and the second lens can have a second focal length. The first lens is at the first focal length behind the output plane of the spectrometer, and the second lens is at the second focal length in front of the input plane of the detector. A Fourier plane is at the first focal length behind the first lens and at the second focal length in front of the second lens.

In the second embodiments, or any other embodiment, the filtering module further comprises a spatial filter disposed at the Fourier plane. In the second embodiments, or any other embodiment, the spatial filter comprises at least one of a variable dimension aperture, a variable transmission pattern, a fixed aperture, and a fixed mask pattern. In the second embodiments, or any other embodiment, the system further comprises a controller configured to adjust a property of the spatial filter to reduce the spectral noise. In the second embodiments, or any other embodiment, the controller narrows an aperture of the spatial filter to reduce the spectral noise.

In the second embodiments, or any other embodiment, the system further comprises a phase/amplitude modulator that modifies a portion of interrogating light to produce an interference pattern, at or prior to the detector, effective to reduce the spectral noise and/or to remove a first spectral component. In the second embodiments, or any other embodiment, the phase/amplitude modulator is a spatial light modulator. In the second embodiments, or any other embodiment, the system further comprises one or more masks disposed within the optical train of the spectrometer and constructed to modulate the interference pattern. In the second embodiments, or any other embodiment, each mask comprises a locally variable phase/amplitude mask. In the second embodiments, or any other embodiment, the system further comprises a controller configured to adjust the phase/amplitude modulator to alter the interference pattern.

In the second embodiments, or any other embodiment, at least the spectrometer and the filtering module are part of a unitary spectrometry setup.

In the second embodiments, or any other embodiment, the filtering module is an add-on component to an existing spectrometry setup including at least the spectrometer.

In one or more third embodiments, a kit for modification of an existing spectrometry setup comprises a filtering module constructed to produce spatial filtering or interference of light so as to reduce spectral noise caused by light propagating through an optical train of a spectrometer prior to being detected by a detector.

In the third embodiments, or any other embodiment, the filtering module is constructed to have a least a portion thereof disposed between an output plane of the spectrometer and an input of the detector. In the third embodiments, or any other embodiment, the filtering module is constructed to reduce spectral noise caused by diffraction of a first spectral component of the light propagating through the optical train of the spectrometer.

In the third embodiments, or any other embodiment, the kit comprises one or more masks to be disposed within the optical train of the spectrometer and constructed to block light. In the third embodiments, or any other embodiment, each mask comprises a variable dimension slit, a variable transmission mask, or a locally variable phase/amplitude mask.

In the third embodiments, or any other embodiment, the filtering module comprises a first lens and a second lens. The first lens can have a first focal length and the second lens can have a second focal length. The first lens is at the first focal length behind an output plane of the spectrometer. The second lens is at the second focal length in front of an input of the detector. A Fourier plane is at the first focal length behind the first lens and at the second focal length in front of the second lens. In the third embodiments, or any other embodiment, the filtering module further comprises a spatial filter disposed at the Fourier plane. In the third embodiments, or any other embodiment, the spatial filter comprises at least one of a variable dimension aperture, a variable transmission pattern, a fixed aperture, and a fixed mask pattern.

In the third embodiments, or any other embodiment, the kit comprises one or more beam splitters, and a phase/amplitude modulator configured to modify a portion of interrogating light, via one or more beam splitters, to produce an interference pattern effective to reduce the spectral noise and/or to remove a first spectral component. In the third embodiments, or any other embodiment, the phase/amplitude modulator is a spatial light modulator. In the third embodiments, or any other embodiment, the kit further comprises one or more locally variable phase/amplitude masks to be disposed within the optical train of the spectrometer and constructed to modulate the interference pattern.

In one or more fourth embodiments, a spectrometer system comprises a spectrometer and a kit according to one or more of the third embodiments. The spectrometer comprises at least one of a Brillouin light scattering spectrometer, a Raman spectrometer, or a Rayleigh-wing scattering or fluorescence spectrometer.

In one or more fifth embodiments, a method comprises separating first and second spectral components, received from a sample, using a spectrometer. The method can also comprise reducing an intensity of the first spectral component or spectral noise induced by the first spectral component. The method can also comprise detecting at a detector the second spectral component.

In the fifth embodiments, or any other embodiment, the reducing the intensity comprises using one or more masks within an optical train of the spectrometer to block the first spectral component. In the fifth embodiments, or any other embodiment, each mask comprises a variable dimension slit, a variable transmission mask, or a locally variable phase/amplitude mask. In the fifth embodiments, or any other embodiment, respective locations of the one or more masks are based on conjugate planes of the optical train of the spectrometer. In the fifth embodiments, or any other embodiment, the reducing the intensity further comprises spatial filtering, prior to the detecting, to reduce spectral noise caused by diffraction due to the first spectral component propagating through the optical train of the spectrometer.

In the fifth embodiments, or any other embodiment, the reducing the intensity comprises generating an interference pattern between light interrogating the sample modified by a phase/amplitude modulator and light output from the spectrometer, and modulating the interference pattern using one or more locally variable phase/amplitude masks within the optical train of the spectrometer. The modulated interference pattern is effective to reduce the intensity of the first spectral component and/or the intensity of spectral noise caused by diffraction due to the first spectral component propagating through the optical train of the spectrometer. In the fifth embodiments, or any other embodiment, the phase/amplitude modulator is a spatial light modulator.

In the fifth embodiments, or any other embodiment, the spectrometer comprises at least one of a Brillouin light scattering spectrometer, a Raman spectrometer, or a Rayleigh-wing scattering or fluorescence spectrometer.

It will be appreciated that the aspects of the disclosed subject matter can be implemented, fully or partially, in hardware, hardware programmed by software, software instruction stored on a computer readable medium (e.g., a non-transitory computer readable medium), or any combination of the above. For example, components of the disclosed subject matter, including components such as a controller, process, or any other feature, can include, but are not limited to, a personal computer or workstation or other such computing system that includes a processor, microprocessor, microcontroller device, or is comprised of control logic including integrated circuits such as, for example, an application specific integrated circuit (ASIC).

One of ordinary skill in the art will readily appreciate that the above description is not exhaustive, and that aspects of the disclosed subject matter may be implemented other than as specifically disclosed above. Indeed, embodiments of the disclosed subject matter can be implemented in hardware and/or software using any known or later developed systems, structures, devices, and/or software by those of ordinary skill in the applicable art from the functional description provided herein.

In this application, unless specifically stated otherwise, the use of the singular includes the plural, and the separate use of "or" and "and" includes the other, i.e., "and/or." Furthermore, use of the terms "including" or "having," as well as other forms such as "includes," "included," "has," or "had," are intended to have the same effect as "comprising" and thus should not be understood as limiting.

Any range described herein will be understood to include the endpoints and all values between the endpoints. Whenever "substantially," "approximately," "essentially," "near," or similar language is used in combination with a specific value, variations up to and including 10% of that value are intended, unless explicitly stated otherwise.

It is thus apparent that there is provided, in accordance with the present disclosure, methods and devices for reducing spectral noise, and spectrometry systems employing such devices. Many alternatives, modifications, and variations are enabled by the present disclosure. While specific examples have been shown and described in detail to illustrate the application of the principles of the present invention, it will be understood that the invention may be embodied otherwise without departing from such principles. For example, disclosed features may be combined, rearranged, omitted, etc. to produce additional embodiments, while certain disclosed features may sometimes be used to advantage without a corresponding use of other features. Accordingly, Applicant intends to embrace all such alternative, modifications, equivalents, and variations that are within the spirit and scope of the present invention.

The invention claimed is:

1. A method comprising:
reducing spectral noise caused by a first spectral component propagating through an optical train of a spectrometer by spatial filtering or interference between an output plane of the spectrometer and a detector; and
detecting at the detector a second spectral component passing through the optical train of the spectrometer,
wherein the second spectral component has a wavelength shifted from that of the first spectral component, and
the spectral noise comprises spatial frequencies generated by diffraction of the first spectral component.

2. The method of claim 1,
wherein the spectral noise is caused by diffraction due to the first spectral component propagating through the optical train of the spectrometer, and
wherein the spectral noise is reduced by a filtering module that produces said spatial filtering or interference, and
at least a portion of the filtering module is disposed between the output plane of the spectrometer and the detector.

3. The method of claim 2, wherein:
the filtering module has a 4f imaging configuration, with a first lens having a first focal length, a second lens having a second focal length, the output plane of the spectrometer being at the first focal length in front of the first lens, an input plane of the detector being at a second focal length behind the second lens, and a Fourier plane being at the first focal length behind the first lens and at the second focal length in front of the second lens, and
a spatial filter is disposed at the Fourier plane.

4. A method comprising:
reducing spectral noise caused by a first spectral component propagating through an optical train of a spectrometer by spatial filtering or interference between an output plane of the spectrometer and a detector; and
detecting at the detector a second spectral component passing through the optical train of the spectrometer,
wherein the second spectral component has a wavelength different from that of the first spectral component,
the spectral noise is caused by diffraction due to the first spectral component propagating through the optical train of the spectrometer,
the spectral noise is reduced by a filtering module that produces said spatial filtering or interference,
at least a portion of the filtering module is disposed between the output plane of the spectrometer and the detector, and
an interference pattern is generated by the filtering module based on light interrogating a sample using a phase/amplitude modulator, the interference pattern being effective to reduce the spectral noise caused by diffraction and/or to remove the first spectral component.

5. The method of claim 4, wherein the phase/amplitude modulator is a spatial light modulator.

6. The method of claim 4, wherein the interference pattern is generated within the portion of the filtering module between the spectrometer and the detector.

7. The method of claim 4,
wherein the reducing an intensity or changing a phase of the first spectral component comprises using one or more masks within the optical train of the spectrometer to modulate the interference pattern, and
wherein each mask comprises a locally variable phase/amplitude mask.

8. A system comprising:
a spectrometer having an optical train;
a detector; and
a filtering module,
wherein the filtering module is constructed to produce spatial filtering or interference of light so as to reduce spectral noise caused by light propagating through the optical train of the spectrometer prior to being detected by the detector, and
the spectral noise comprises spatial frequencies generated by diffraction of the light.

9. The system of claim 8,
wherein the filtering module is constructed to reduce spectral noise caused by diffraction of a first spectral component of the light propagating through the optical train of the spectrometer, and
wherein the spectrometer comprises at least one of a Brillouin light scattering spectrometer, a Raman spectrometer, or a Rayleigh-wing scattering or fluorescence spectrometer.

10. The system of claim 8,
wherein the spectrometer includes one or more masks disposed within the optical train of the spectrometer and constructed to block light,
wherein respective locations of the one or more masks are based on conjugate planes of the optical train of the spectrometer and the filtering module,
wherein each mask comprises a variable dimension slit, a variable transmission mask, or a locally variable phase/amplitude mask, and
further comprising a controller configured to adjust a property of each mask to reduce one or more spectral components prior to the filtering module.

11. The system of claim 8,
wherein at least a portion of the filtering module is disposed between an output plane of the spectrometer and an input plane of the detector,
wherein the filtering module comprises:
a first lens having a first focal length, and
a second lens having a second focal length, wherein the first lens is at the first focal length behind the output plane of the spectrometer, the second lens is at the second focal length in front of the input plane of the detector, and a Fourier plane is at the first focal length behind the first lens and at the second focal length in front of the second lens, wherein the filtering module further comprises a spatial filter disposed at the Fourier plane, and further comprising a controller configured to adjust a property of the spatial filter to reduce the spectral noise, wherein the controller narrows an aperture of the spatial filter to reduce the spectral noise.

12. A system comprising:
a spectrometer having an optical train;
a detector;
a filtering module constructed to produce spatial filtering or interference of light so as to reduce spectral noise caused by light propagating through the optical train of the spectrometer prior to being detected by the detector; and
a phase/amplitude modulator that modifies a portion of interrogating light to produce an interference pattern, at or prior to the detector, effective to reduce the spectral noise and/or to remove a first spectral component.

13. The system of claim 12, wherein the phase/amplitude modulator is a spatial light modulator.

14. The system of claim 12, further comprising:
one or more masks disposed within the optical train of the spectrometer and constructed to modulate the interference pattern,
wherein each mask comprises a locally variable phase/amplitude mask.

15. The system of claim 12, further comprising a controller configured to adjust the phase/amplitude modulator to alter the interference pattern.

16. A kit for modification of an existing spectrometry setup, comprising:
a filtering module constructed to produce spatial filtering or interference of light so as to reduce spectral noise caused by light propagating through an optical train of a spectrometer prior to being detected by a detector,
wherein the spectral noise comprises spatial frequencies generated by diffraction of the light.

17. The kit of claim 16, wherein the filtering module is constructed to reduce spectral noise caused by diffraction of a first spectral component of the light propagating through the optical train of the spectrometer.

18. The kit of claim 16, further comprising:
one or more masks to be disposed within the optical train of the spectrometer and constructed to block light
wherein each mask comprises a variable dimension slit, a variable transmission mask, or a locally variable phase/amplitude mask.

19. The kit of claim 16, wherein the filtering module comprises:
a first lens having a first focal length, the first lens being at a first focal length behind an output plane of the spectrometer;
a second lens having a second focal length, the second lens being at the second focal length in front of an input plane of the detector; and
a spatial filter,
wherein a Fourier plane is at the first focal length behind the first lens and at the second focal length in front of the second lens, and
the spatial filter is disposed at the Fourier plane.

20. A kit for modification of an existing spectrometry setup, comprising:
a filtering module constructed to produce spatial filtering or interference of light so as to reduce spectral noise caused by light propagating through an optical train of a spectrometer prior to being detected by a detector;
one or more beam splitters; and
a phase/amplitude modulator configured to modify a portion of interrogating light, via the one or more beam splitters, to produce an interference pattern effective to reduce the spectral noise and/or to remove a first spectral component.

21. The kit of claim 20, wherein the phase/amplitude modulator is a spatial light modulator.

22. The kit of claim 20, further comprising one or more locally variable phase/amplitude masks to be disposed within the optical train of the spectrometer and constructed to modulate the interference pattern.

* * * * *